(12) United States Patent
Sugiyama et al.

(10) Patent No.: US 12,371,587 B2
(45) Date of Patent: *Jul. 29, 2025

(54) STRETCHABLE FILM AND SURFACE COATING COMPOSITION

(71) Applicant: 3M INNOVATIVE PROPERTIES COMPANY, St. Paul, MN (US)

(72) Inventors: Naota Sugiyama, Tokyo (JP); Shinsuke Kondo, Yamagata (JP); Tatsuya Sato, Tokyo (JP); Yoshihiko Takeda, Miyagi (JP)

(73) Assignee: 3M Innovative Properties Company, St. Paul, MN (US)

( * ) Notice: Subject to any disclaimer, the term of this patent is extended or adjusted under 35 U.S.C. 154(b) by 702 days.

This patent is subject to a terminal disclaimer.

(21) Appl. No.: 16/756,810

(22) PCT Filed: Oct. 16, 2018

(86) PCT No.: PCT/IB2018/058026
§ 371 (c)(1),
(2) Date: Apr. 16, 2020

(87) PCT Pub. No.: WO2019/077502
PCT Pub. Date: Apr. 25, 2019

(65) Prior Publication Data
US 2020/0239729 A1 Jul. 30, 2020

(30) Foreign Application Priority Data
Oct. 17, 2017 (JP) .................. 2017-200975

(51) Int. Cl.
*C09D 175/04* (2006.01)
*B44C 1/10* (2006.01)
(Continued)

(52) U.S. Cl.
CPC ......... *C09D 175/04* (2013.01); *C08G 18/409* (2013.01); *C08G 18/44* (2013.01);
(Continued)

(58) Field of Classification Search
None
See application file for complete search history.

(56) References Cited

U.S. PATENT DOCUMENTS 4,740,577 A 4/1988 DeVoe
5,545,476 A * 8/1996 O'Dell .................... B32B 21/14
428/524
(Continued)

FOREIGN PATENT DOCUMENTS

JP 06184952 7/1994
JP 07052290 2/1995
(Continued)

OTHER PUBLICATIONS

Suzuki—JP 2004-262105 A—IDS—MT—resin beads—2-part silicone acrylic-PU—2004 (Year: 2004).*
(Continued)

*Primary Examiner* — John Vincent Lawler (57) ABSTRACT

Object: Provided is a stretchable film having a low-glass appearance, wherein the low gloss appearance does not readily change even when the film is stretched. Solution: A stretchable film of one embodiment of the present disclosure includes a surface layer including: a binder comprising urethane resin; urethane resin beads having an average particle size of not less than 4 μm and not greater than 20 μm; and nanosilica particles; wherein the surface gloss is not greater than 5 GU at 60 degrees.

12 Claims, 1 Drawing Sheet

(51) Int. Cl.
*C08G 18/40* (2006.01)
*C08G 18/44* (2006.01)
*C08G 18/61* (2006.01)
*C08G 18/76* (2006.01)
*C08J 7/04* (2020.01)
*C08J 7/043* (2020.01)
*C08J 7/046* (2020.01)
*C08K 3/36* (2006.01)

(52) U.S. Cl.
CPC ......... *C08G 18/61* (2013.01); *C08G 18/7642* (2013.01); *C08J 7/0427* (2020.01); *C08J 7/043* (2020.01); *C08J 7/046* (2020.01); *B44C 1/105* (2013.01); *C08J 2327/06* (2013.01); *C08J 2475/04* (2013.01); *C08K 3/36* (2013.01); *C08K 2201/005* (2013.01); *C08K 2201/011* (2013.01)

(56) References Cited

U.S. PATENT DOCUMENTS

| | | | | |
|---|---|---|---|---|
| 5,760,122 | A * | 6/1998 | Susa | C09D 7/005 524/492 |
| 6,709,748 | B1 | 3/2004 | Ho | |
| 8,030,430 | B2 | 10/2011 | Fan | |
| 2008/0220224 | A1 * | 9/2008 | Tokumoto | B32B 7/12 428/195.1 |
| 2010/0173132 | A1 * | 7/2010 | Furukawa | B32B 27/20 428/172 |
| 2011/0023945 | A1 * | 2/2011 | Hayashi | C09D 127/08 136/251 |
| 2012/0321862 | A1 * | 12/2012 | Ikeda | B44C 1/175 428/195.1 |
| 2013/0041091 | A1 * | 2/2013 | Brinkhuis | C08K 5/098 524/513 |
| 2013/0059120 | A1 * | 3/2013 | Shi | C08J 7/046 428/147 |
| 2014/0255669 | A1 * | 9/2014 | Akou | B32B 27/283 428/203 |
| 2015/0361293 | A1 * | 12/2015 | Ito | C09D 4/06 428/141 |
| 2016/0024330 | A1 * | 1/2016 | Jung | C08J 7/046 428/313.9 |
| 2016/0115340 | A1 * | 4/2016 | Hashimoto | G02B 1/14 428/143 |
| 2016/0145465 | A1 * | 5/2016 | Furutaka | C09D 11/00 428/205 |
| 2016/0257155 | A1 * | 9/2016 | Yumoto | B41M 5/506 |
| 2016/0318328 | A1 * | 11/2016 | Satou | C04B 41/52 |

FOREIGN PATENT DOCUMENTS

| | | | |
|---|---|---|---|
| JP | 09309166 | 12/1997 | |
| JP | 2001/335752 | * 12/2001 | ............ B32B 27/10 |
| JP | 2004/262105 | * 9/2004 | ............... B05D 7/24 |
| JP | 2008/238602 | * 10/2008 | ............ B32B 33/00 |
| JP | 2008238601 | 10/2008 | |
| JP | 2009280665 | 12/2009 | |
| JP | 2011/255552 | * 12/2011 | ............ B32B 27/20 |
| JP | 2013-142119 | 7/2013 | |
| JP | 2015/101609 | * 6/2015 | ............ B32B 27/16 |
| JP | 2015227029 | 12/2015 | |
| JP | 2016203432 | 12/2016 | |
| JP | 2017/159544 | * 9/2017 | ............ B32B 27/00 |
| KR | 2013/0013452 | * 2/2013 | ........... C09D 101/00 |
| KR | 1020130013452 | 2/2013 | |
| WO | WO 2008-129667 | 10/2008 | |

OTHER PUBLICATIONS

Kano—JP 2008-238602 A—ISR D1 of related app—MT—decorative sheet—2008 (Year: 2008).*
Omichi—JP 2011-255552 A—IDS—Biblio+Google MT—resin beads+sizee—2011 (Year: 2011).*
Kim—KR 2013-0013452 A—ISR D2—MT—transparent paint composition—2013 (Year: 2013).*
Kasai—JP 2017-159544 A—ISR D3 of related app—MT—decorative sheet—2017 (Year: 2017).*
Fortaps—The great flexibility and resistance of polyethylene plastic—Oct. 20, 2021 (Year: 2021).*
Leder—effects of fumed silica in modern coatings—Prog.Org. Coat.—2002 (Year: 2002).*
Xunyu Chemical—Size of fumed silica—2011 (Year: 2011).*
Nomura—JP 2001-335752 A—ISR D2 of related app—MT—coating comp—2001 (Year: 2001).*
Tsujimoto—JP 2015-101609 A—sister of IDS—Biblio+MT-GoogleSave—urethane acrylate w—urethane particles of amount & size—2015 (Year: 2015).*
Electrolube—polyurethane resin—density of mixed system—Aug. 3, 2023 (Year: 2023).*
SICT—Density—alumina & other ceramics—Aug. 3, 2023 (Year: 2023).*
Stokes's law—Britannica Online Encyclopedia (Year: 2023).*
Micro Touch 800F TDS—urethane beads—density—Mar. 2023 (Year: 2023).*
International Search Report for PCT International Application No. PCT/IB2018/058026, mailed on Apr. 12, 2019, 4 pages.

* cited by examiner

STRETCHABLE FILM AND SURFACE COATING COMPOSITION

TECHNICAL FIELD

The present disclosure relates to a stretchable film and a surface coating composition that can be used in applications such as decoration.

BACKGROUND ART

Decorative films are used for the purpose of decorating interiors and exteriors of buildings, vehicles, and the like. For example, a known decorative film is one formed by laminating a polyvinyl chloride film provided with a printed layer and a transparent polyvinyl chloride film, and then performing an embossing process. By using various combinations of lamination and embossing processes, it can be made to exhibit the texture of various materials such as woodgrain, metal, fabric, and marble.

For example, Patent Document 1 (JP 2011-255552A) describes "an embossed decorative sheet obtained by performing an embossing process on a surface of a decorative sheet, wherein a surface protective layer comprising a curable resin comprising synthetic resin beads is provided on a surface side of the decorative sheet, the embossing process is an average amplitude from 15 to 50 μm, and the synthetic resin beads are synthetic resin beads having an average particle size of from 8 to 20 μm.

Patent Document 2 (WO 2008/129667) describes "a decorative sheet provided with a protective layer mainly composed of a transparent resin component provided on a surface of a printed layer provided on a printing sheet, wherein the protective layer comprises a first protective layer provided on the printed layer of the printing sheet and a second protective layer containing transparent or semitransparent spherical particles and provided on given areas of the first protective layer, and the luster of a salient surface of the first protective layer is lower than the luster of a surface of the second protective layer."

PRIOR ART DOCUMENTS

Patent Documents

Patent Document 1: JP 2011-255552 A
Patent Document 2: WO 2008/129667

SUMMARY OF THE INVENTION

Problem to be Solved by the Invention

Recently there has been a demand for stretchable film having a lower-gloss appearance that can mimic the surface of dry finished wood, a matte finish, or the like.

In a known method, a decorative film having a surface with a low-gloss appearance is formed by coating it with a surface layer of resin containing microparticles or beads. These decorative films can be used on building exterior decorations or interior decorations, vehicle interior decorations, furniture, product surface decorations, and the like. In many cases, the film needs to be stretched to make it conform to the shape of the product to which it is stuck. However, it is very difficult to form a stretchable film having a low-gloss appearance because when the film is stretched, the surface structure changes and gloss increases.

The present disclosure provides a stretchable film having a low-gloss appearance, wherein the low-gloss appearance does not readily change even when the film is stretched.

Means for Solving the Problem

According to one embodiment, provided is a stretchable film including a surface layer containing a binder containing urethane resin, urethane resin beads having an average particle size of not less than 4 μm and not greater than 20 μm, and nanosilica particles, wherein the surface gloss is not greater than 5 GU at 60 degrees.

According to another embodiment, provided is a surface coating composition containing a binder precursor containing a urethane resin composition, urethane resin beads having an average particle size of not less than 4 μm and not greater than 20 μm, and nanosilica particles.

Effect of the Invention

Because the stretchable film of the present disclosure has a low-gloss appearance wherein the low-gloss appearance does not readily change even when the film is stretched, it can be advantageously used in interior and exterior decoration of buildings, vehicles, and the like. Furthermore, using the surface coating composition of the present disclosure makes it possible to form a stretchable surface layer with low gloss on a substrate surface, wherein the low-gloss appearance does not readily change even when stretched.

Note that the above description should not be construed as disclosing all of the embodiments of the present invention or all of the advantages related to the present invention.

DESCRIPTION OF THE PREFERRED EMBODIMENTS

A more detailed description will be given below for the purpose of illustrating typical embodiments of the present invention, but the present invention is not limited to these embodiments.

In the present disclosure, "transparent" means that the total luminous transmittance of a certain material or product is not less than approximately 85% in the wavelength range from 400 to 700 nm; "semi-transparent" means that the total luminous transmittance of a certain material or product is not less than approximately 20% and less than approximately 85% in the wavelength range from 400 to 700 nm; and "opaque" means that the total luminous transmittance of a certain material or product is less than approximately 20% in the wavelength range from 400 to 700 nm. Total luminous transmittance is determined in conformance with JIS K7361-1: 1997 (ISO 13468-1: 1996).

In one embodiment, the stretchable film includes a surface layer containing a binder containing a urethane resin composition, urethane resin beads having an average particle size of not less than 4 µm and not greater than 20 µm, and nanosilica particles. The surface gloss of the stretchable film is not greater than approximately 5 GU at 60 degrees. Due to the surface layer containing urethane resin beads having an average particle size within the above range and nanosilica particles, low gloss and conservation of appearance after stretching can be imparted to the stretchable film.

Figure 1:
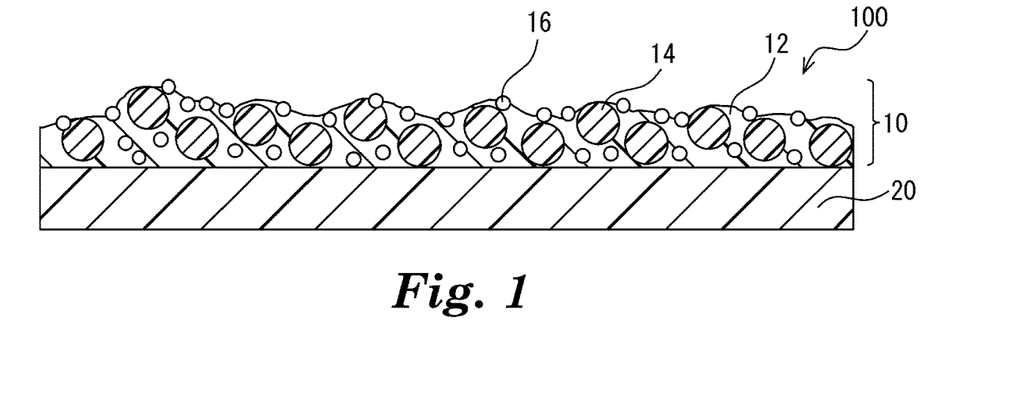
FIG. 1 is a schematic cross-sectional view of a stretchable film of an embodiment of the present disclosure.

FIG. 1 illustrates a schematic cross-sectional view of the stretchable film of the present disclosure. The stretchable film 100 of FIG. 1 includes a surface layer 10 and a substrate layer 20, which is an optional constituent element. The stretchable film 100 may be formed from the surface layer 10 alone. That is, the surface layer 10 itself may be a stretchable film. The surface layer 10 contains a binder 12 containing a urethane resin, urethane resin beads 14 having an average particle size of not less than 4 µm and not greater than 20 µm, and nanosilica particles 16.

The binder contains a urethane resin. Various known urethane resins may be used as the urethane resin. The urethane resin may be obtained by drying or curing a urethane resin composition. The urethane resin composition may be an aqueous system or a non-aqueous system. It is advantageous in a case where the urethane resin is a cured product of a two-component urethane resin composition. The two-component urethane resin composition is generally a non-aqueous urethane resin composition. By using a two-component resin composition when forming the surface layer, the other components of the surface layer, such as the urethane resin beads, nanosilica particles, form chemical bonds with the urethane resin to prevent or suppress loss of these particles and bleed-out of components from the surface layer.

The two-component urethane resin composition generally contains a polyol as a base compound and a polyfunctional isocyanate as a curing agent, and may contain a catalyst and/or a solvent as necessary.

As the polyol, polyester polyols such as polycaprolactone diol and polycaprolactone triol; polycarbonate polyols such as cyclohexane dimethanol carbonate and I,6-hexane diol carbonate; and combinations thereof may be used. These polyols can impart transparency, weather resistance, strength, chemical resistance, and the like to the surface layer. Polycarbonate polyols in particular can form a surface layer having high transparency and chemical resistance. The polyol is preferably a diol from the perspective of imparting stretchability to the surface layer without forming an excessively crosslinked structure. Polyester diols and polycarbonate diols, especially polycarbonate diols, may be advantageously used.

The OH value of the polyol may generally be not less than approximately 10 mg/KOH, not less than approximately 20 mg/KOH, or not less than approximately 30 mg/KOH, and not greater than approximately 150 g/KOH, not greater than approximately 130 g/KOH, or not greater than approximately 120 mg/KOH.

Examples of the polyfunctional isocyanate include aliphatic polyisocyanates, alicyclic polyisocyanates, aromatic polyisocyanates, aromatic-aliphatic polyisocyanates, and the like, and oligomers (dimers, trimers, and the like), biuret-modified compounds, allophanate-modified compounds, polyol-modified compounds, oxadiazinetrione-modified compounds, carbodiimide-modified compounds, and the like of these polyisocyanates. The polyfunctional isocyanate is preferably a diisocyanate from the perspective of imparting stretchability to the surface layer without forming an excessively crosslinked structure. Examples of such diisocyanates include aliphatic diisocyanates such as tetramethylene diisocyanate and hexamethylene diisocyanate (HDI); alicyclic diisocyanates such as isophorone diisocyanate, trans,trans-, trans,cis-, and cis,cis-dicyclohexylmethane-4,4'-diisocyanate and mixtures thereof (hydrogenated MDI); aromatic diisocyanates such as 2,4-tolylene diisocyanate and 2,6-tolylene diisocyanate, and isomeric mixtures of these tolylene diisocyanates (TDI), 4,4'-diphenylmethane diisocyanate, 2,4'-diphenylmethane diisocyanate, and 2,2'-diphenylmethane diisocyanate, and isomeric mixtures of these diphenylmethane diisocyanates (MDI); and aromatic-aliphatic diisocyanates such as 1,3- or 1,4-xylylene diisocyanate or mixtures thereof (XDL), and 1,3- or 1,4-tetramethylxylylene diisocyanate or mixtures thereof (TMXDI).

As the equivalence ratio of polyols and polyisocyanates, the polyisocyanates per 1 equivalent of polyols may generally be not less than approximately 0.6 equivalents or not less than approximately 0.7 equivalents, and not greater than approximately 2 equivalents or not greater than approximately 1.2 equivalents.

As catalysts, those generally used in forming urethane resin, for example, di-n-butyltin dilaurate, zinc naphthenate, zinc octenoate, triethylenediamine, and the like, may be used. The used amount of catalyst may generally be not less than approximately 0.005 parts by mass or not less than approximately 0.01 parts by mass, and not greater than approximately 0.5 parts by mass or not greater than approximately 0.2 parts by mass, based on 100 parts by mass of two-component urethane resin composition.

The binder may further contain a cellulose ester. By including a cellulose ester in the binder, the viscosity of the binder in the drying process can be raised and surface fluidity can be reduced, thereby making it possible to uniformly spread the binder precursor that contains urethane resin beads. Examples of the cellulose ester include cellulose acetate propionate, cellulose acetate butyrate, and the like.

Considering solubility in the solvent, the molecular weight of the cellulose ester may generally be not less than approximately 12000, not less than approximately 16000, or not less than approximately 20000, and not greater than approximately 110000, not greater than approximately 100000, or not greater than approximately 90000.

Considering shape conservation at the usage temperature, the glass transition temperature (Tg) of the cellulose ester may generally be not lower than approximately 85° C., not lower than approximately 96° C., or not lower than approximately 101° C., and not higher than approximately 190° C., not higher than approximately 180° C., or not higher than approximately 160° C.

In several embodiments, the binder may contain cellulose ester in an amount of not less than approximately 5 parts by mass, not less than approximately 10 parts by mass, or not less than approximately 15 parts by mass, and not greater than approximately 35 parts by mass, not greater than approximately 30 parts by mass, or not greater than approximately 25 parts by mass, based on 100 parts by mass of binder. By setting the blended amount of cellulose ester within the above range, the urethane resin beads can be more uniformly dispersed in the surface layer and a uniform low-gloss appearance can be imparted to the surface layer.

The surface layer of the present embodiment contains urethane resin beads. Due to the presence of the beads on the film surface, fine indentations and protrusions are formed and a low-gloss structure can be formed on the film surface. Additionally, because affinity with the binder containing urethane resin is good, the urethane resin beads have high adhesion with the binder. As a result, detachment of the urethane resin beads from the binder when the film is stretched or deformed can be suppressed.

Crosslinked polyurethane microparticles obtained by suspension polymerization, seed polymerization, emulsification polymerization, or the like may be used as the urethane resin beads. The urethane resin beads have excellent flexibility, toughness, mar resistance, and the like, and can impart these characteristics to the surface layer.

The average particle size of the urethane resin beads is preferably not less than approximately 4 μm and not greater than approximately 20 μm. In several embodiments, the average particle size of the urethane resin beads may be not less than approximately 6 μm or not less than approximately 10 μm, and not greater than approximately 10 μm or not greater than approximately 15 μm. When the average particle size of the urethane resin beads is less than approximately 4 μm, whitening of the film surface due to light scattering readily occurs. When the average particle size of the urethane resin beads is greater than approximately 20 μm, gloss is readily produced and low gloss is not readily obtained. Urethane resin beads having an average particle size within the above range can impart low lightness, that is, low gloss with little whiteness, to the surface layer because they scatter light incident on the surface an appropriate degree.

In several embodiments, the surface layer may contain urethane resin beads in an amount of not less than approximately 70 parts by mass, not less than approximately 80 parts by mass, or not less than approximately 100 parts by mass, and not greater than approximately 240 parts by mass, not greater than approximately 230 parts by mass, or not greater than approximately 200 parts by mass, based on 100 parts by mass of binder. When the blended amount of urethane resin beads is less than approximately 70 parts by mass, low gloss is not readily obtained. When it is greater than approximately 240 parts by mass, whitening readily occurs. By setting the blended amount of urethane resin beads within the above range, a surface layer that exhibits low gloss across a wide range of viewing angles, for example, from 20 degrees to 85 degrees, can be obtained.

The surface layer of the present embodiment further contains nanosilica particles. Nanosilica particles being present in the binder suppresses changes in low gloss and effectively prevents whitening of the film, which readily occur when the film is stretched in the case of urethane resin beads alone.

Examples of the nanosilica particles include silica sols obtained using water glass (sodium silicate solution) as the starting material. The surface of the nanosilica particles may be modified using a surface treatment agent such as a silane, alcohol, amine, carboxylic acid, sulfonic acid, phosphonic acid, or titanate.

In several embodiments, the average particle size of the nanosilica particles may be not less than approximately 10 nm, not less than approximately 20 nm, or not less than approximately 30 nm, and not greater than approximately 100 nm, not greater than approximately 75 nm, or not greater than approximately 45 nm. By using such tiny nanosilica particles, the nanosilica particles can be dispersed to a high degree in the surface layer. Even when the film is stretched, loss of low gloss is suppressed and whitening of the film can be effectively prevented because the tiny nanosilica particles remain dispersed in the stretched parts. There is also the possibility that a nanosilica particle that is in contact with a urethane resin bead acts as a certain type of physical crosslinking point between the urethane bead and the binder. The presence of nanosilica particles which can act as physical crosslinking points can suppress loss of urethane beads and effectively prevent whitening of the film when the film is stretched.

In several embodiments, the surface layer may contain nanosilica particles in an amount of not less than approximately 5 parts by mass, not less than approximately 10 parts by mass, or not less than approximately 20 parts by mass, and not greater than approximately 120 parts by mass, not greater than approximately 110 parts by mass, or not greater than approximately 100 parts by mass, based on 100 parts by mass of binder. By setting the blended amount of nanosilica particles within the above range, low-gloss appearance is maintained even when the stretchable film is stretched. For example, an increase in lightness, that is, whitening, can be prevented or suppressed when the film is stretched 150%. Furthermore, setting the blended amount of nanosilica particles within the above range makes it possible to impart excellent mar resistance to the surface layer.

The surface layer may further contain a silicone-modified polymer containing a functional group capable of reacting with an isocyanate or hydroxyl group. When finger oil attaches to the low-gloss surface, traces thereof are easily seen. Including a silicone-modified polymer containing a functional group capable of reacting with an isocyanate or hydroxyl group in the surface layer makes it possible to increase the fingerprint resistance of the surface layer. The silicone-modified polymer may impart mar resistance to the surface layer by reducing the coefficient of friction of the surface layer and making it slippery. An isocyanate or hydroxyl group of the silicone-modified polymer can react with a hydroxyl group or isocyanate group of the urethane resin in the binder or the urethane resin beads to bond the silicone-modified polymer to the urethane resin or urethane resin beads. In this embodiment, bleed-out of the silicone-modified polymer from the surface layer can be prevented or suppressed.

Examples of the silicone-modified polymer containing a functional group capable of reacting with an isocyanate or hydroxyl group include silicone-modified polymers such as polyether-modified silicone, polyester-modified silicone, aralkyl-modified silicone, acrylic-modified silicone, silicone-modified polyacrylate, and urethane-modified silicone. Examples of the functional group capable of reacting with an isocyanate or hydroxyl group of the silicone-modified polymer include a hydroxyl group, an amino group having an active carbon, an isocyanate group, an epoxy group, an acid anhydride group, and the like. Due to having particularly excellent fingerprint resistance, silicone-modified polyacrylate is advantageous as the silicone-modified polymer. The silicone-modified polymer preferably contains a hydroxyl group or an isocyanate group, particularly a hydroxy group, which has high reactivity with an isocyanate or hydroxyl group.

In several embodiments, the surface layer may contain silicone-modified polymers containing a functional group capable of reacting with an isocyanate or hydroxyl group, for example silicone-modified polyacrylate, in an amount of not less than approximately 0.1 parts by mass, not less than approximately 0.5 parts by mass, or not less than approximately 1.0 parts by mass, and not greater than approximately 15 parts by mass, not greater than approximately 12 parts by mass, or not greater than approximately 10 parts by mass, based on 100 parts by mass of binder. Setting the blended amount of silicone-modified polymer within the above range makes it possible to further increase either or both fingerprint resistance and mar resistance of the surface layer.

As other optional components, the surface layer may contain additives such as fillers other than urethane resin beads and nanosilica particles, UV absorbents, photostabilizers, heat stabilizers, dispersing agents, plasticizers, flow improving agents, and leveling agents. The individual and total blended amounts of these additives may be determined within a range that preserves the characteristics needed in the surface layer.

The surface coating may be formed using a surface coating composition containing a binder precursor containing the above urethane resin composition, urethane resin beads having an average particle size of not less than 4 μm and not greater than 20 μm, and nanosilica particles.

The binder precursor may contain the above cellulose ester for a binder in addition to the urethane resin composition. The cellulose ester can impart quick-drying ability, tack-drying ability, flowability or leveling ability to the surface coating composition. The cellulose ester may also be used for the purpose of adjusting viscosity of the surface coating composition.

The surface coating composition may further contain the above silicone-modified polymer containing a functional group capable of reacting with an isocyanate or hydroxyl group. An isocyanate or hydroxyl group of the silicone-modified polymer can react with a hydroxyl group or isocyanate group of the urethane resin composition or the urethane resin beads, thereby bonding the silicone-modified polymer to the urethane resin or urethane resin beads. Thus, bleed-out of the silicone-modified polymer from the surface layer can be prevented or suppressed. When a silicone-modified polymer is used, it is advantageous in a case where the urethane resin composition is a two-component urethane resin composition from the perspective of reactivity.

Blending of the surface coating composition is as described in regard to the surface layer. The blended amounts of cellulose ester, urethane resin beads, nanosilica particles, and silicone-modified polymer containing a functional group capable of reacting with an isocyanate or hydroxyl group are applied while changing "100 parts of mass of binder" to "100 parts by mass of binder precursor."

To improve workability, coatability, and the like, the surface coating composition may further contain a solvent such as ketones such as methyl ethyl ketone, methyl isobutyl ketone, and acetylacetone; aromatic hydrocarbons such as toluene and xylene; alcohols such as ethanol and isopropyl alcohol; esters such as ethyl acetate and butyl acetate; ethers such as tetrahydrofuran, propylene glycol monomethyl ether, propylene glycol monomethyl ether acetate (1-methoxy-2-propylacetate), and dipropylene glycol monomethyl ether acetate. The blended amount of solvent in the surface coating composition is generally not less than approximately 20 parts by mass or not less than approximately 30 parts by mass, and not greater than approximately 60 parts by mass or not greater than approximately 50 parts by mass, based on 100 parts by mass of binder precursor.

The viscosity of the surface coating composition is generally not less than approximately 20 mPa·s, not less than approximately 50 mPa·s, or not less than approximately 100 mPa·s, and not greater than approximately 1000 mPa·s, not greater than approximately 800 mPa·s, or not greater than approximately 600 mPa·s. The viscosity of the surface coating composition is measured at a rotational speed of 60 rpm using a B-type viscometer with an appropriate spindle.

The surface layer may be formed by coating a substrate with the surface coating composition using a knife coater, bar coater, blade coater, doctor coater, roll coater, cast coater, or the like, and performing either or both drying and curing by heating at approximately 80° C. to 150° C. as necessary.

The thickness of the surface layer may be, for example, not less than approximately 3 μm, not less than approximately 5 μm, or not less than approximately 10 μm, and not greater than approximately 50 μm, not greater than approximately 30 μm, or not greater than approximately 20 μm. The thickness of the surface layer in the present disclosure means the thickness of the thickest portion, that is, the maximum thickness.

In several embodiments, the surface layer is transparent or semi-transparent. In these embodiments, the total luminous transmittance of the surface layer in the wavelength range from 400 to 700 nm may be not less than approximately 80%, not less than approximately 85%, or not less than approximately 90%. In these embodiments, the decoration such as printing imparted to the substrate is visible through the surface layer.

The stretchable film may further contain a stretchable substrate layer as a substrate. As the stretchable substrate layer, one or more resin layers selected from the group consisting of polyvinyl chloride, polyurethane, polyethylene, polypropylene, vinyl chloride-vinyl acetate resin, acrylic resin, cellulose resin, and fluorine resin may be used.

The stretchable substrate layer may be colored or colorless. The stretchable substrate layer may be opaque, semi-transparent, or transparent. The stretchable substrate layer may have a substantially smooth surface or a structured surface that can be formed by surface processing such as embossing. Due to the appearance or shape of the stretchable substrate layer being as described above, it is possible to impart a variety of decorative characteristics to the stretchable film.

In one embodiment, the stretchable substrate layer includes a transparent polyvinyl chloride resin layer and a colored polyvinyl chloride resin layer. In the stretchable film of this embodiment, the colored polyvinyl chloride resin layer may be supported or protected by the transparent polyvinyl chloride resin layer and may impart durability to the decorative characteristics of the stretchable film. The stretchable film of this embodiment may be advantageously used in applications in which it is stuck onto an interior decorative member or an exterior decorative member of, for example, a building or vehicle.

The thickness of the stretchable substrate layer may be, for example, not less than approximately 25 μm, not less than approximately 50 μm, or not less than approximately 80 μm, and not greater than approximately 5 mm, not greater than approximately 1 mm, or not greater than approximately 0.5 mm.

In several embodiments, the tensile elongation of the stretchable substrate layer is not less than approximately 10%, not less than approximately 20%, or not less than approximately 30%, and not greater than approximately 400%, not greater than approximately 350%, or not greater than approximately 300%. The tensile elongation of the stretchable substrate layer is the value obtained by preparing a sample 25 mm wide and 150 mm long, elongating it at temperature 20° C., tensile speed 300 mm/min, and chuck distance 100 mm until it breaks, and calculating {[chuck distance at breakage (mm)−chuck distance before elongation (mm) (=100 mm)]/chuck distance before elongation (mm) (=100 mm)}×100(%).

The stretchable substrate layer may also have an adhesive layer on the side opposite the surface layer. As the adhesive layer, a generally used solvent type, emulsion type, pressuresensitive type, heat-sensitive type, heat-curable type, or UV-curable type of adhesive agent, such as an acrylic-based, polyolefin-based, polyurethane-based, polyester-based, or rubber-based adhesive agent may be used. The thickness of the adhesive layer may generally be not less than approximately 5 μm, not less than approximately 10 μm, or not less than approximately 20 μm, and not greater than approximately 100 μm, not greater than approximately 80 μm, or not greater than approximately 50 μm.

A liner may be provided on the surface of the adhesive layer. Examples of the liner include paper, plastic materials such as polyethylene, polypropylene, polyester, and cellulose acetate; and paper coated with such plastic materials. The liner may also have a surface that has been release-treated with silicone or the like. The thickness of the liner is generally not less than approximately 5 μm, not less than approximately 15 μm, or not less than approximately 25 μm, and not greater than approximately 500 μm, not greater than approximately 300 μm, or not greater than approximately 250 μm.

In one embodiment, the surface gloss of the stretchable film is not greater than approximately 5 GU when the measurement angle is 60 degrees. In several embodiments, the surface gloss of the stretchable film is not greater than approximately 0.7 GU, not greater than approximately 0.5 GU, or not greater than approximately 0.3 GU, at 60 degrees.

In one embodiment, the surface gloss of the stretchable film is not greater than approximately 0.2 GU at 20 degrees, not greater than approximately 0.7 GU at 60 degrees, and not greater than approximately 5.0 GU at 85 degrees. In several embodiments, the surface gloss of the stretchable film is not greater than approximately 0.2 GU at 20 degrees, not greater than approximately 0.5 GU at 60 degrees, and not greater than approximately 4.5 GU at 85 degrees, or not greater than approximately 0.1 GU at 20 degrees, not greater than approximately 0.3 GU at 60 degrees, and not greater than approximately 4.0 GU at 85 degrees. Due to the surface gloss of the stretchable film being a combination within the above range, reflection of light incident at various angles on the stretchable film can be suppressed and the decoration of the stretchable film can be seen from a wide range of viewing angles.

In several embodiments, the lightness $L^*$ of the stretchable film is not greater than approximately 23, not greater than approximately 22.5, or not greater than approximately 22.0, when measured with a D65/10 light source with SCI mirror treatment and 0% UV reflection using a spectrophotometric colorimeter.

In several embodiments, when the lightness before stretching of the stretchable film is taken as $L^*_1$, the lightness after 150% stretching is taken as $L^*_2$, and the lightness difference is taken as $\Delta L^*$, which is equal to $L^*_2$ minus $L^*_1$, the lightness difference $\Delta L^*$ is not greater than approximately 3, not greater than approximately 2.5, or not greater than approximately 2.0. In this embodiment, whitening when the stretchable film is stretched is suppressed. For this reason, when the stretchable film is applied to a surface while being bent or stretched, the decorative characteristics of the stretchable film can be maintained even at the bent parts or stretched parts.

The applications of the stretchable film of the present disclosure are not particularly limited. For example, the stretchable film of the present disclosure may be used as interior decorative members for walls, staircases, ceilings, columns, finishes, and the like or as exterior decorative members of exterior walls and the like. Furthermore, it can be used for interior decoration and exterior decoration of various transportation vehicles such as railroad ears, ships, airplanes, and automobiles including two-wheeled and four-wheeled vehicles. Additionally, it may also be used as surface decoration for any product such as road signs, billboards, furniture, appliances, and the like.

EXAMPLES

Specific embodiments of the present disclosure will be illustrated in the examples below, but the present invention is not limited thereto. All parts and percentages are by mass unless otherwise noted. Numeric values include error arising intrinsically from measurement principles and measurement equipment. Numeric values are indicated by significant digits that have been rounded by typical methods.

The materials, reagents, and the like used in these examples are shown in Table 1.

TABLE 1

| Name | Description | Source |
|---|---|---|
| Art Pearl CE-800T | Urethane resin beads, average particle size 6 μm | Negami Chemical Industrial Co., Ltd. (Nomi City, Ishikawa Prefecture, Japan) |
| Art Pearl C-800 | Urethane resin beads, average particle size 6 μm | Negami Chemical Industrial Co., Ltd. (Nomi City, Ishikawa Prefecture, Japan) |
| Art Pearl C-600 | Urethane resin beads, average particle size 10 μm | Negami Chemical Industrial Co., Ltd. (Nomi City, Ishikawa Prefecture, Japan) |
| Art Pearl C-400 | Urethane resin beads, average particle size 15 μm | Negami Chemical Industrial Co., Ltd. (Nomi City, Ishikawa Prefecture, Japan) |
| Art Pearl C-1000 | Urethane resin beads, average particle size 3 μm | Negami Chemical Industrial Co., Ltd. (Nomi City, Ishikawa Prefecture, Japan) |
| Art Pearl C-300 | Urethane resin beads, average particle size 22 μm | Negami Chemical Industrial Co., Ltd. (Nomi City, Ishikawa Prefecture, Japan) |
| Art Pearl C-200 | Urethane resin beads, average particle size 32 μm | Negami Chemical Industrial Co., Ltd. (Nomi City, Ishikawa Prefecture, Japan) |

TABLE 1-continued

| Name | Description | Source |
|---|---|---|
| Art Pearl C-100 | Urethane resin beads, average particle size 50 μm | Negami Chemical Industrial Co., Ltd. (Nomi City, Ishikawa Prefecture, Japan) |
| Art Pearl G-800 | Acrylic resin beads, average particle size 6 μm | Negami Chemical Industrial Co., Ltd. (Nomi City, Ishikawa Prefecture, Japan) |
| MIBK ST L | Nanosilica particles, average particle size 40 to 50 nm, 30 mass % methyl isobutyl ketone (MIBK) dispersion | Nissan Chemical Industries, Ltd. (Chiyoda-ku, Tokyo, Japan) |
| MIBK ST | Nanosilica particles, average particle size 10 to 15 nm, 30 mass % MIBK dispersion | Nissan Chemical Industries, Ltd. (Chiyoda-ku, Tokyo, Japan) |
| MIBK SD | Nanosilica particles, average particle size 10 to 15 nm, 30 mass % MIBK dispersion | Nissan Chemical Industries, Ltd. (Chiyoda-ku, Tokyo, Japan) |
| MIBK SD L | Nanosilica particles, average particle size 40 to 50 nm, 30 mass % MIBK dispersion | Nissan Chemical Industries, Ltd. (Chiyoda-ku, Tokyo, Japan) |
| T5652 | Polycarbonate diol, OH value 51 to 61 mg KOH/g, viscosity 7000 to 16000 mPa · s (50° C.) | Asahi Kasei Corporation (Chiyoda-ku, Tokyo, Japan) |
| G4672 | Polycarbonate diol, OH value 46 to 56 mg KOH/g, viscosity 12000 to 2500 mPa · s (50° C.) | Asahi Kasei Corporation (Chiyoda-ku, Tokyo, Japan) |
| G3452 | Polycarbonate diol, OH value 51 to 61 mg KOH/g, viscosity 6800 to 13000 mPa · s (50° C.) | Asahi Kasei Corporation (Chiyoda-ku, Tokyo, Japan) |
| MCPV-12 | Hydroxyl group-containing polyurethane, 30 mass % methyl ethyl ketone solution, 2500 mPa · s (25° C.) | Tosoh Corporation (Minato-ku, Tokyo, Japan) |
| CAB-381-20 | Cellulose acetate butyrate | Eastman Chemical Company (Kingsport, Tennessee, U.S.A.) |
| SILCLEAN 3700 | Hydroxyl group-containing silicone-modified polymer | BYK Chemical Japan Co., Ltd. (Shinjuku-ku, Tokyo, Japan) |
| D110N | Xylylene diisocyanate | Mitsui Chemicals, Inc. (Minato-ku, Tokyo, Japan) |
| CORONATE HX | Hexamethylene diisocyanate | Tosoh Corporation (Minato-ku, Tokyo, Japan) |
| 1-methoxy-2-propyl acetate | Solvent | Sigma-Aldrich Co. LLC (St. Louis, Missouri, U.S.A.) |
| 4-methyl-2-pentanone | Solvent | Wako Pure Chemical Industries, Ltd. (Chuo-ku, Osaka, Japan) |
| PS-1183MT | Matte-tone decorative film | 3M Company (St. Paul, Minnesota, U.S.A.) |
| Artificial finger oil solution | — | Hayashi Pure Chemical Ind., Ltd. (Osaka, Japan) |
| Three Ace #0000 | Steel wool | Yamazaki Corporation (Osaka, Japan) |

Transparent Resin Substrate Layer

A polyethylene terephthalate (PET) film was preheated and laminated on a polyvinyl chloride film measuring 80 μm in thickness, and a transparent resin substrate layer was obtained. The composition of the polyvinyl chloride film was polyvinyl chloride/ester-based plasticizer/organic stabilizers (acrylic resin, zinc stearate, and the like)=72/16/12 (mass ratio). The PET film was Teijin (trade name) Tetoron (trade name) Film G2, thickness 50 μm (Teijin Film Solutions Ltd., Chiyoda-ku, Tokyo, Japan).

Example 1

A mixture having the composition shown in Table 2 was mixed for 3.5 min using a planetary centrifugal mixer THINKY AR-250 (Thinky Corporation, Chiyoda-ku, Tokyo, Japan), and a surface coating composition was obtained. A polyvinyl chloride film of the transparent resin substrate layer was coated with the surface coating composition using a knife coater with a gap of 40 μm, and this was dried and cured for 2 min in a 65° C. oven and for 5 min in a 120° C. oven, to form a surface layer with dry thickness of approximately 12 μm. The PET film was peeled from the obtained film, and laminated with an 80 μm thick black polyvinyl chloride film (polyvinyl chloride/ester-based plasticizer/organic stabilizers, pigments, and the like (acrylic resin, zinc stearate, and the like)=72/16/12 (mass ratio)), and this was pressed using a heated roller at a linear speed of 7 m/min at nip pressure 0.2 MPa and temperature 60° C.

Examples 2 to 5

Surface coating compositions were prepared and stretchable films were obtained in the same manner as Example 1 except that the blended amounts of nanosilica particles and urethane resin beads were varied as shown in Table 2.

Examples 6 to 8

Surface, coating compositions were prepared and stretchable films were obtained in the same manner as Example 1 except that the type of nanosilica particles was varied.

Comparative Example 1

A stretchable film was obtained in the same manner as Example 1 except that a surface layer was not formed.

Comparative Example 2

A commercially available matte-tone decorative film (brand name DI-NOC (trade name) film PS-1183MT (3M Japan Ltd., Shinagawa-ku, Tokyo, Japan)) was used unaltered as a stretchable film.

Comparative Example 3

A surface coating composition was prepared and a stretchable film was obtained in the same manner as Example 1 except that nanosilica particles were not used and the blended amount of urethane resin beads was changed as shown in Table 2.

Comparative Example 4

A surface coating composition was prepared and a stretchable film was obtained in the same manner as Example 1 except that the urethane resin beads were changed to acrylic resin beads and the blended amount was changed as shown in Table 2.

TABLE 2

| | Example 1 | Example 2 | Example 3 | Example 4 | Example 5 | Example 6 | Example 7 | Example 8 |
|---|---|---|---|---|---|---|---|---|
| Art Pearl CE-800T | 15 | 15 | 15 | 15 | 15 | 15 | 15 | 15 |
| Art Pearl G-800 | — | — | — | — | — | — | — | — |
| MIBK ST L | 15 | 5 | 10 | 20 | 25 | — | — | — |
| MIBK ST | — | — | — | — | — | 15 | — | — |
| MIBK SD | — | — | — | — | — | — | 15 | — |
| MIBK SD L | — | — | — | — | — | — | — | 15 |
| T5652 | 8.4 | 10.8 | 9.6 | 7.2 | 6.0 | 8.4 | 8.4 | 8.4 |
| MCPV-12 | — | — | — | — | — | — | — | — |
| CAB-381-20 | 2.1 | 2.7 | 2.4 | 1.8 | 1.5 | 2.1 | 2.1 | 2.1 |
| SILCLEAN 3700 | 1.2 | 1.2 | 1.2 | 1.2 | 1.2 | 1.2 | 1.2 | 1.2 |
| D110N | 2.52 | 3.24 | 2.88 | 2.16 | 1.80 | 2.52 | 2.52 | 2.52 |
| CORONATE HX | — | — | — | — | — | — | — | — |
| 1-methoxy-2-propyl acetate | 59.5 | 66.5 | 63.0 | 56.0 | 52.5 | 59.5 | 59.5 | 59.5 |
| 4-methyl-2-pentanone | — | — | — | — | — | — | — | — |
| Nanosilica particles/binder × 100 | 42.9 | 11.1 | 25.0 | 66.7 | 100 | 42.9 | 42.9 | 42.9 |
| Resin beads/binder × 100 | 143 | 111 | 125 | 167 | 200 | 143 | 143 | 143 |

| | Comparative Example 3 | Comparative Example 4 |
|---|---|---|
| Art Pearl CE-800T | 15 | — |
| Art Pearl G-800 | — | 15 |
| MIBK ST L | — | 15 |
| MIBK ST | — | — |
| MIBK SD | — | — |
| MIBK SD L | — | — |
| T5652 | 12.0 | — |
| MCPV-12 | — | 31.58 |
| CAB-381-20 | 3.0 | — |
| SILCLEAN 3700 | 1.2 | 0.9 |
| D110N | 3.60 | — |
| CORONATE HX | — | 1.58 |
| 1-methoxy-2-propyl acetate | 70.0 | — |
| 4-methyl-2-pentanone | — | 38.42 |
| Nanosilica particles/binder × 100 | 0.0 | 47.5 |
| Resin beads/binder × 100 | 100 | 158.3 |

Surface Gloss

For Examples 1 to 8, Comparative Examples 1 to 4, and Reference Examples 1 to 15, surface gloss was measured at measurement angles of 20, 60, and 85 degrees using a portable gloss meter BYK-Gardner micro-TRI-gloss (BYK Chemical Japan Co., Ltd., Shinjuku-ku, Tokyo, Japan). When surface gloss is not greater than 5 GU at 60 degrees, it can be assessed that practical low gloss conditions are satisfactory. Furthermore, when surface gloss satisfies all three conditions of not greater than 0.2 GU at measurement angle 20 degrees, not greater than 0.7 GU at 60 degrees, and not greater than 5.0 GU at 85 degrees, it can be assessed that the sample exhibits a very good low-gloss surface appearance.

Surface Colorimetry

For Examples 1 to 8, Comparative Examples 1 to 4, and Reference Examples 1 to 15, the lightness $L^*$ was measured with a D65/10 degree light source with SCI mirror treatment and 0% UV reflection using a spectrophotometric colorimeter CM-3700d (Konica Minolta Japan, Inc., Minato-ku, Tokyo, Japan). When lightness $L^*$ is not greater than 23, it can be assessed that lightness is good, with low gloss.

Lightness $L^*$ After 150% Stretching

For Examples 1 to 8 and Comparative Examples 1 to 4, samples precut to 150 mm×15 mm were stretched 150% at a speed of 100 mm/min in an environment at temperature 20° C. and relative humidity 60% using a Tensiklon universal tester RTC-1210A (A&D Co., Ltd., Toyoshima-ku, Tokyo, Japan). Surface colorimetry was performed for the samples after stretching. The lightness difference $\Delta L^*$ was calculated taking the lightness before stretching as $L^*_1$, the lightness after 150% stretching as $L^*_2$, and the lightness difference as $\Delta L^*$, which is equal to $L^*_2$ minus $L^*_1$. When the lightness difference $\Delta L^*$ is not greater than 3, it can be assessed that the change in low gloss due to stretching is small.

Fingerprint Resistance

For Example 1, the fingerprint resistance of the surface layer was assessed using an artificial finger oil solution. The artificial finger oil solution was dripped onto the surface, and the surface was rubbed back and forth with a cotton swab for 100 cycles. After that, the solution was wiped off with a dried or moistened paper towel. There was substantially no change in color of the surface, and it exhibited good fingerprint resistance.

Mar Resistance

For Example 1, the mar resistance of the surface layer was assessed using a steel wool abrasion test. Using #0000 steel wool having a head area of 7.6 cm (3 inches) in diameter, the surface layer was rubbed back and forth for 10 cycles under a load of 500 grams. After that, the sample was rinsed with water to remove steel wool particles, and after remaining water was wiped off with a paper towel, the surface layer was visually observed. There were no visible scratches, and the sample exhibited good mar resistance.

Adhesion Characteristics

For Example 1, the adhesion characteristics were assessed using the crosscut method in conformance with JIS K5600-5-6: 1999. A 5×5 grid was formed with 1 mm spacing using 851 silicone tape (3M Japan Ltd., Shinagawa-ku, Tokyo, Japan). Separation between layers, peeling, and cracking were not seen on the surface, and the sample exhibited good adhesion characteristics.

Figure 2A:
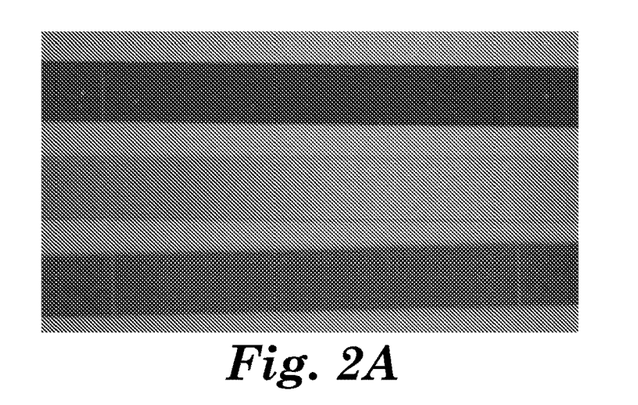
FIG. 2A are photographs depicting the appearance before stretching of the stretchable films of Example 1, Comparative Example 1, and Comparative Example 2 in order from the top.
Figure 2B:
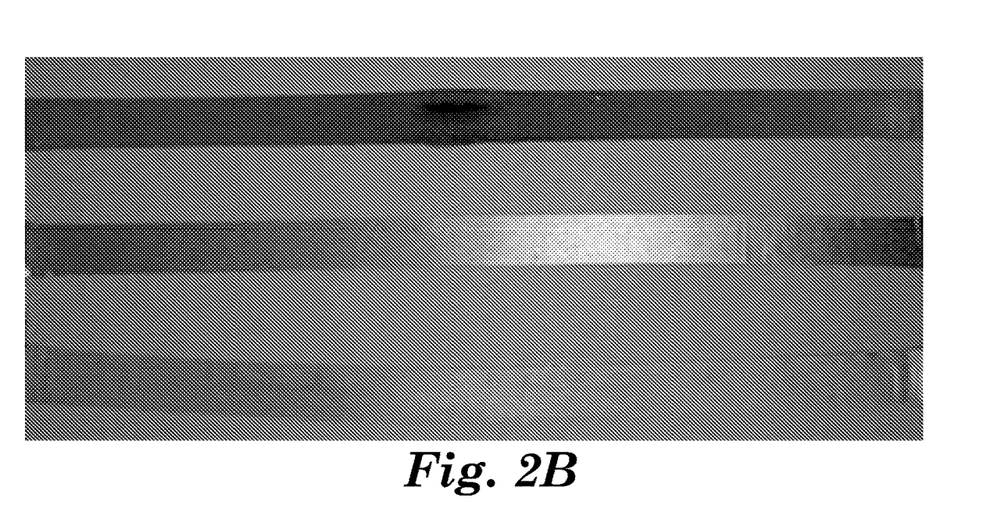
FIG. 2B are photographs depicting the appearance after 150% stretching of the stretchable films of Example 1, Comparative Example 1, and Comparative Example 2 in order from the top.

The evaluation results of the stretchable films of Examples 1 to 8 and Comparative Examples 1 to 4 are shown in Table 3. FIG. 2A are photographs depicting the appearance before stretching of the stretchable films of Example 1, Comparative Example 1, and Comparative Example 2 in order from the top. FIG. 2B are photographs depicting the appearance after 150% stretching in the same order. The stretchable film of Example 1 exhibited low gloss and did not whiten even after stretching. The stretchable film of Comparative Example 1 exhibited high gloss. In the stretchable film of Comparative Example 2, whitening was observed after stretching.

TABLE 3

| | Surface gloss (GU) | | | $L^*_1$ (before stretching) | $L^*_2$ (after 150% stretching) | $\Delta L^*$ |
|---|---|---|---|---|---|---|
| | 20° | 60° | 85° | | | |
| Example 1 | 0.1 | 0.3 | 4.1 | 18.85 | 21.25 | 2.4 |
| Example 2 | 0.1 | 0.6 | 3.2 | 22.44 | 23.76 | 1.3 |
| Example 3 | 0.0 | 0.4 | 3.7 | 21.17 | 22.16 | 1.0 |
| Example 4 | 0.0 | 0.3 | 4.1 | 19.23 | 21.67 | 2.4 |
| Example 5 | 0.0 | 0.3 | 4.2 | 19.32 | 21.29 | 2.0 |
| Example 6 | 0.0 | 0.3 | 3.9 | 18.19 | 20.38 | 2.2 |
| Example 7 | 0.1 | 0.3 | 3.9 | 19.71 | 22.64 | 2.9 |
| Example 8 | 0.0 | 0.4 | 4.0 | 20.95 | 21.86 | 0.9 |
| Comparative Example 1 | 0.6 | 6.2 | 16.6 | 25.56 | 26.93 | 1.4 |
| Comparative Example 2 | 0.1 | 1.6 | 2.8 | 21.79 | 27.73 | 5.9 |
| Comparative Example 3 | 0.1 | 0.6 | 3.0 | 21.15 | 31.82 | 10.7 |
| Comparative Example 4 | 0.1 | 0.6 | 4.3 | 32.14 | 47.14 | 25.0 |

Reference Examples 1 to 15

Surface coating compositions were prepared in the same manner as Example 1 with the compositions shown in Table 4, and stretchable films were obtained for the purpose of examining the relationships of type, average particle size, and blended amount of urethane resin beads and type of binder with surface gloss and lightness. The surface coating compositions of these reference examples did not contain nanosilica particles.

TABLE 4

| | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|
| Art Pearl CE-800T | 18.0 | — | — | — | 18.0 | 18.0 | 18.0 | 9.0 |
| Art Pearl C-800 | — | 18.0 | — | — | — | — | — | — |
| Art Pearl C-600 | — | — | 18.0 | — | — | — | — | — |
| Art Pearl C-400 | — | — | — | 18.0 | — | — | — | — |
| Art Pearl C-1000 | — | — | — | — | — | — | — | — |
| Art Pearl C-300 | — | — | — | — | — | — | — | — |
| Art Pearl C-200 | — | — | — | — | — | — | — | — |
| Art Pearl C-100 | — | — | — | — | — | — | — | — |
| T5652 | 9.6 | 9.6 | 9.6 | 9.6 | — | — | — | 16.8 |
| G4672 | — | — | — | — | 9.6 | — | — | — |

TABLE 4-continued

|  | | | | | | | | |
|---|---|---|---|---|---|---|---|---|
| G3452 | — | — | — | — | — | 9.6 | — | — |
| MCPV-12 | — | — | — | — | — | — | 36.0 | — |
| CAB-381-20 | 2.4 | 2.4 | 2.4 | 2.4 | 2.4 | 2.4 | — | 4.2 |
| SILCLEAN 3700 | 1.2 | 1.2 | 1.2 | 1.2 | 1.2 | 1.2 | 1.2 | 1.2 |
| D110N | 2.88 | 2.88 | 2.88 | 2.88 | 2.88 | 2.88 | 2.52 | 5.04 |
| 1-methoxy-2-propyl acetate | 70.0 | 70.0 | 70.0 | 70.0 | 70.0 | 70.0 | 46.0 | 70.0 |
| Nanosilica particles/ binder × 100 | 0.0 | 0.0 | 0.0 | 0.0 | 0.0 | 0.0 | 0.0 | 0.0 |
| Urethane resin beads/ binder × 100 | 150 | 150 | 150 | 150 | 150 | 150 | 167 | 43 |

|  | Reference Example 9 | Reference Example 10 | Reference Example 11 | Reference Example 12 | Reference Example 13 | Reference Example 14 | Reference Example 15 |
|---|---|---|---|---|---|---|---|
| Art Pearl CE-800T | 12.0 | 21.0 | 24.0 | — | — | — | — |
| Art Pearl C-800 | — | — | — | — | — | — | — |
| Art Pearl C-600 | — | — | — | — | — | — | — |
| Art Pearl C-400 | — | — | — | — | — | — | — |
| Art Pearl C-1000 | — | — | — | 18.0 | — | — | — |
| Art Pearl C-300 | — | — | — | — | 18.0 | — | — |
| Art Pearl C-200 | — | — | — | — | — | 18.0 | — |
| Art Pearl C-100 | — | — | — | — | — | — | 18.0 |
| T5652 | 14.4 | 7.2 | 4.8 | 9.6 | 9.6 | 9.6 | 9.6 |
| G4672 | — | — | — | — | — | — | — |
| MCPV-12 | — | — | — | — | — | — | — |
| CAB-381-20 | 3.6 | 1.8 | 1.2 | 2.4 | 2.4 | 2.4 | 2.4 |
| SILCLEAN 3700 | 1.2 | 1.2 | 1.2 | 1.2 | 1.2 | 1.2 | 1.2 |
| D110N | 4.32 | 2.16 | 1.44 | 2.88 | 2.88 | 2.88 | 2.88 |
| 1-methoxy-2-propyl acetate | 70.0 | 70.0 | 69.34 | 70.0 | 70.0 | 70.0 | 70.0 |
| Nanosilica particles/ binder × 100 | 0.0 | 0.0 | 0.0 | 0.0 | 0.0 | 0.0 | 0.0 |
| Urethane resin beads/ binder × 100 | 67 | 233 | 400 | 150 | 150 | 150 | 150 |

The evaluation results of the stretchable films of Reference Examples 1 to 15 are shown in Table 5.

TABLE 5

|  | Surface gloss (GU) | | | L* |
|---|---|---|---|---|
|  | 20° | 60° | 85° |  |
| Reference Example 1 | 0.0 | 0.1 | 3.3 | 17.07 |
| Reference Example 2 | 0.0 | 0.3 | 2.9 | 19.94 |
| Reference Example 3 | 0.0 | 0.2 | 2.5 | 18.53 |
| Reference Example 4 | 0.1 | 0.3 | 2.1 | 18.62 |
| Reference Example 5 | 0.1 | 0.3 | 3.3 | 19.32 |
| Reference Example 6 | 0.0 | 0.3 | 3.8 | 19.49 |
| Reference Example 7 | 0.1 | 0.6 | 3.5 | 22.71 |
| Reference Example 8 | 0.4 | 5.0 | 9.1 | 24.61 |
| Reference Example 9 | 0.2 | 2.5 | 3.6 | 24.51 |
| Reference Example 10 | 0.0 | 0.4 | 3.2 | 23.37 |
| Reference Example 11 | 0.0 | 0.7 | 3.5 | 32.11 |
| Reference Example 12 | 0.1 | 0.6 | 2.5 | 34.82 |
| Reference Example 13 | 0.0 | 0.9 | 1.4 | 20.09 |
| Reference Example 14 | 0.1 | 1.6 | 1.0 | 20.95 |
| Reference Example 15 | 0.3 | 3.7 | 1.2 | 21.94 |

[Reference Numerals]
100 Stretchable film
10 Surface layer
12 Binder
14 Urethane resin bead
16 Nanosilica particle
20 Substrate layer

The invention claimed is:

1. A stretchable film comprising a surface layer, the surface layer comprising:
   a binder comprising urethane resin;
   urethane resin beads having an average particle size of not less than 4 μm and not greater than 20 μm; and
   nanosilica particles, the stretchable film having a surface gloss being not greater than 5 GU at 60 degrees,
   wherein the urethane resin beads in the surface layer comprise greater than 100 parts by mass and not greater than 240 parts by mass based on 100 parts by mass of the binder.

2. The stretchable film according to claim 1, wherein an average particle size of the nanosilica particles is not less than 10 nm and not greater than 100 nm.

3. The stretchable film according to claim 1, wherein the surface layer comprises not less than 5 parts by mass and not greater than 120 parts by mass of the nanosilica particles, based on 100 parts by mass of the binder.

4. The stretchable film according to claim 1, wherein, when a lightness before stretching of the stretchable film is taken as $L^*_1$, a lightness after 150% stretching is taken as $L^*_2$, and a lightness difference is taken as $\Delta L^*$, equaling $L^*_2$ minus $L^*_1$, the lightness difference $\Delta L^*$ is not greater than 3.

5. The stretchable film according to claim 1, wherein the binder further comprises a cellulose ester.

6. The stretchable film according to claim 1, wherein the urethane resin comprises a cured product of a two-component urethane resin composition.

7. The stretchable film according to claim 1, wherein the surface layer further comprises a silicone-modified polymer containing a functional group capable of reacting with an isocyanate or hydroxyl group.

8. The stretchable film according to claim 1, wherein the lightness $L^*$ of the film is not greater than 23.

9. A surface coating composition comprising:
   a binder precursor comprising a urethane resin composition;
   urethane resin beads having an average particle size of not less than 4 μm and not greater than 20 μm; and
   nanosilica particles,
   wherein the urethane resin beads comprise greater than 100 parts by mass and not greater than 240 parts by mass based on 100 parts by mass of the binder.

10. The surface coating composition according to claim 9, wherein an average particle size of the nanosilica particles is not less than 10 nm and not greater than 100 nm.

11. The surface coating composition according to claim 9, the composition comprising not less than 5 parts by mass and not greater than 120 parts by mass of the nanosilica particles, based on 100 parts by mass of the binder precursor.

12. The surface coating according to claim 9, wherein the lightness $L^*$ of the composition when coated is not greater than 23.

* * * * *